United States Patent [19]

Chase

[11] 4,077,495
[45] Mar. 7, 1978

[54] ENERGY ABSORBER

[75] Inventor: Michael John Chase, Kidderminster, England

[73] Assignee: Imperial Metal Industries (Kynoch) Limited, Birmingham, England

[21] Appl. No.: 676,346

[22] Filed: Apr. 12, 1976

[30] Foreign Application Priority Data

Apr. 17, 1975 United Kingdom ............... 15965/75

[51] Int. Cl.² .............................................. F16F 7/12
[52] U.S. Cl. ...................................... 188/1 C; 29/417
[58] Field of Search ................. 188/1 C; 29/458, 460, 29/417, DIG. 46; 74/492, 493; 156/197; 264/41, DIG. 6; 293/70; 428/117, 313, 425

[56] References Cited

U.S. PATENT DOCUMENTS

| 2,724,463 | 11/1955 | Becker | 188/1 C |
| 2,998,214 | 8/1961 | Peterman | 188/1 C X |
| 3,130,819 | 4/1964 | Marshall | 188/1 C |
| 3,249,659 | 5/1966 | Voelker | 428/425 X |
| 3,675,746 | 7/1972 | Irvine | 188/1 C |
| 3,721,433 | 3/1973 | Sobel | 188/1 C X |
| 3,842,944 | 10/1974 | Shiotani et al. | 188/1 C |
| 3,991,146 | 11/1976 | Barrie | 428/313 X |
| 3,996,654 | 12/1976 | Johnson | 29/DIG. 46 X |

Primary Examiner—Duane A. Reger
Attorney, Agent, or Firm—Cushman, Darby & Cushman

[57] ABSTRACT

An energy absorbing body comprising glass spheres embedded in elastomer, preferably with a metal reinforcing skeleton, for example aluminium honeycomb extrusion.

15 Claims, 4 Drawing Figures

ENERGY ABSORBER

BACKGROUND OF THE INVENTION

The present invention relates to an energy absorber, particularly but not exclusively for use in a pressure relief valve for terminating a rocket flight.

The rate of combustion in a rocket combustion chamber is usually dependent upon the pressure in the chamber. It is therefore possible to terminate a rocket flight by releasing the pressure in that chamber. This can be effected by means of a remotely controlled pressure relief valve. The valve closure may be in the form of a piston which can be suddenly released to permit the valve to open. However, since substantial pressure will then be applied to the piston, it is essential to absorb energy from it, otherwise it may become an uncontrolled projectile. The preferred embodiment of the invention is intended to provide an energy absorber for such a valve.

SUMMARY OF THE INVENTION

According to the invention, there is provided an energy absorber comprising void-forming members embedded in a matrix to form a crushable body.

The members may be hollow enclosures, eg spheres, and are preferably thin-walled. The members must be at least deformable and are preferably frangible, for example they may be made of glass.

The matrix is preferably of resilient material, for example elastomer.

The absorber may also comprise a deformable structure, in and/or around which the body is formed. The structure may be tubular, and may have a honeycomb cross-section, the body then being formed in the cells of the honeycomb. The structure may be extruded, and it may be of a metal, for example aluminium.

The body may provide one portion of an energy absorbing device, another portion of which provides a different energy absorbing characteristic. For example, where a deformable structure is provided, as discussed above, it may be within and project from the body, the projecting part of the structure forming said other portion of the device.

The invention also relates to a method of forming an energy absorber by embedding void-forming members in a matrix material to form a crushable body. The matrix material may be provided in a flowable form with the members distributed therethrough, and the mixture then being shaped and the matrix material permitted to solidify. The mixture may be shaped in and/or around a deformable structure which provides part of the energy absorber, for example the mixture may be provided in a mould and the structure may be forced into the mould. A plurality of energy absorbers may be formed by forcing a sheetlike structure into the mixture, and dividing the resultant composite sheet transversely thereto to form the individual energy absorbers.

The invention further provides an energy absorbing device comprising a deformable structure having secured thereto a body of crushable material such that the body will absorb a substantially greater amount of energy than the structure for the same movement of an element from which energy is to be absorbed. The structure and the body may be as described above.

According to a preferred embodiment of this aspect of the invention, there is provided an energy device for absorbing energy from a movable element of a pressure relief valve comprising an elongate extruded section having a crushable body comprising a resilient matrix having hollow members embedded therein.

The invention further provides apparatus comprising an element which is movable in a given direction and an energy absorber as defined above arranged to be compressed by the element upon movement of the latter in said direction, thereby to absorb energy from the element. The apparatus may be a pressure release valve and the element may be a valve opening member. The release valve may provide part of a rocket flight terminator.

BRIEF DESCRIPTION OF THE DRAWINGS

By way of example, some embodiments of the invention will be described with reference to the accompanying diagrammatic drawings in which.

DESCRIPTION OF THE PREFERRED EMBODIMENT

British patent specification No. 1368838 refers to a device for terminating a rocket flight. Briefly the device comprises a pipe which is normally closed by a piston which is releasable by remote control to permit the pipe to vent the rocket motor combustion chamber.

Where such a device is to be used in a rocket motor employing a substantial pressure in the combustion chamber, it is desirable to absorb energy from the releasable piston after its release to avoid its becoming an uncontrolled projectile. The general arrangement may then be as shown in FIG. 1, but the details of the valve structure form no part of the present invention, and accordingly that figure is only a diagrammatic illustration.

Figure 1:
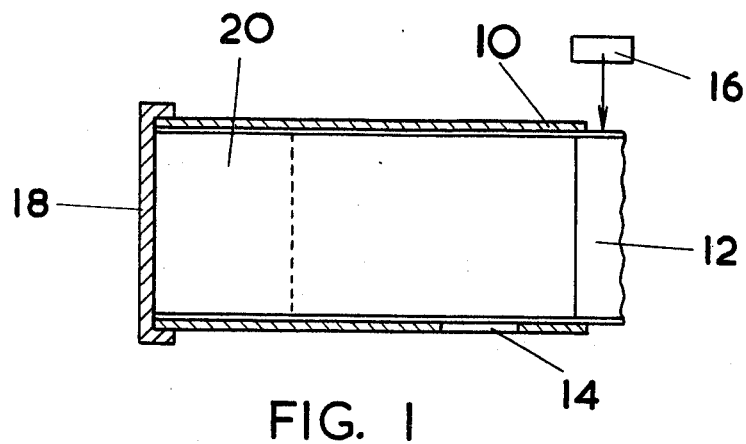
FIG. 1 is a diagrammatic sectioned elevation of a pressure release valve for use in a rocket flight terminator.
Figure 2:
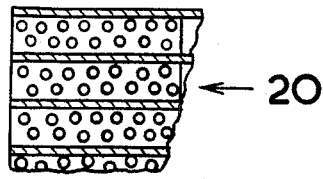
FIG. 2 is a sectioned side elevation of part of an energy absorbing device for use in the release valve shown in FIG. 1.

As envisaged in FIG. 1, the venting pipe 10 may have an extension beyond the releasable piston 12. The extension includes an opening 14 through which the combustion chamber pressure can be vented upon release of the piston by the remote control arrangement diagrammatically indicated at 16. The extension on pipe 10 has an end cap 18 secured thereto, and an energy absorber 20 is located between the piston 12 and the end cap 18.

Upon release of the piston 12, it is forced towards the end cap by the pressure in the combustion chamber to an extent sufficient to vent the combustion chamber via the opening 14. However, the energy absorber 20 takes up energy from the piston 12, and prevents it applying sufficient force to the end cap 18 to cause the latter to blow off.

Figure 3:
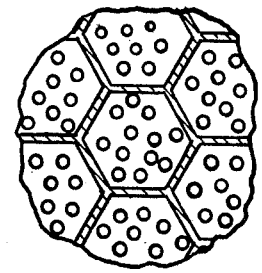
FIG. 3 is a sectioned end elevation of part of the absorber shown in FIG. 2.
Figure 4:
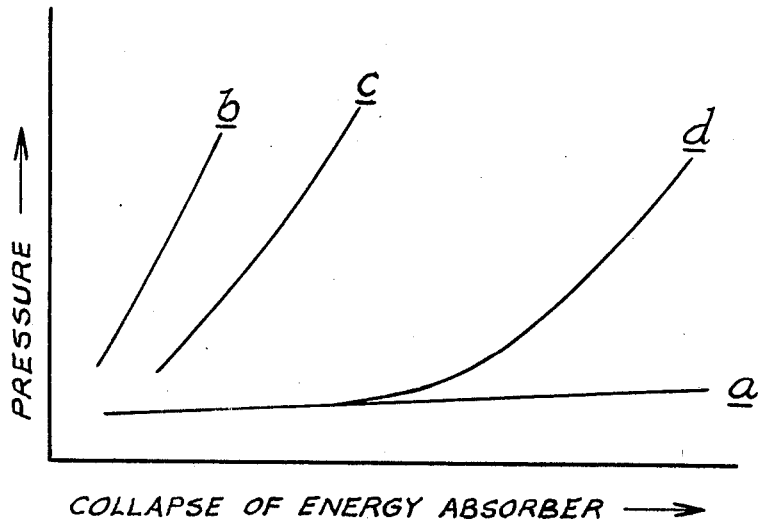
FIG. 4 shows energy absorbing characteristics of different energy absorbers, the compressing pressure applied to the absorber being shown on the vertical axis and resulting collapsing movement of the absorber being shown on the horizontal axis. No units have been appended to this graph because only the shapes of the curves are relevant to the following description.

One possibility for an energy absorber is an extruded section, for example an aluminium section such as that sold under the trade name "Aeroweb". This is a honeycomb section as generally indicated in FIG. 3. The section is deformed by the rearwardly moving piston 12, thereby absorbing energy from the piston. However, it is found that such a section crushes too easily when there is a substantial pressure in the combustion chamber. For example, the energy absorbing characteristic of this section would be as illustrated by curve $a$ in the graph shown in FIG. 4. As shown there, the Aeroweb section permits substantial movement of the piston 12 for quite low pressures in the combustion chamber. Accordingly, a very long section would be required to absorb sufficient energy from the piston under high pressures, and this is impractical.

One possibility for dealing with this difficulty is to fill the Aeroweb section with a resilient material, for example an elastomer. The curve resulting from filling of the Aeroweb section with the silicone elastomer sold under the trade name "Silcoset 105" is shown at $b$ in FIG. 4. It will be seen that there is now a relatively small movement of the piston even at substantial pressures. However, this small movement results in only a small absorption of energy by the energy absorber, and the transference of a substantial force to the end cap 18.

This difficulty can be overcome by means of an energy absorbing material in accordance with the invention comprising a mixture of an elastomer, for example Silcoset 105, with hollow bodies such as those sold under the registered trade mark "Armospheres". The Armospheres give additional "crushability" to the filling in the Aeroweb, permitting a greater movement of the piston and therefore additional absorption of energy from it. For example, the resultant curve may be as shown at $c$ in FIG. 4.

The proportion of hollow bodies in the elastomer may be adjusted in accordance with the amount of energy which it is required to absorb. It is anticipated that less than 25% by weight of hollow bodies in the elastomer will not prove significantly different from unfilled elastomer. It is found that the addition of more than 70% by weight of the hollow bodies stiffens the elastomer to such an extent that it is difficult to incorporate the bodies into the mixture by conventional methods of incorporating a filler in an elastomer.

The use of the new filler material with the Aeroweb may still give rise to a further difficulty if a substantial variation in pressure may occur in the rocket motor combustion chamber in practice. For example, the rocket motor propellant may comprise both a "boost" and a "sustain" portion in the same combustion chamber. These portions may result in substantially different pressures in the chamber at different stages in burning of the propellant, but it may be required to terminate the rocket flight in either of these stages. The pressure variation may be of the order of 5 or 6: 1 as between the "boost" and the "sustain" stages. Thus, whereas a characteristic such as that shown at $c$ in FIG. 4 may be suitable for the high pressure stage of the flight, the movement permitted to the piston at relatively low pressures may be insufficient to allow it to clear the vent opening 14.

Accordingly, the energy absorber 20 shown in FIG. 1 may comprise an Aeroweb section which is only partially filled with the Silcoset/Armospheres mixture. For example, about 1/5 of the length of the section may be filled with this mixture. The resultant characteristic of the energy absorber is shown at $d$ in FIG. 4. As seen there, the unfilled Aeroweb section permits substantial movement of the piston 12 even at low pressures, sufficient to ensure opening of the vent 14. But, after opening of that vent, the piston must crush the body of filler material in addition to deforming the Aeroweb section, this absorbing substantially more energy from the piston.

The energy absorber 20 may be produced employing the following materials:

a. Aeroweb aluminium honeycomb section supplied by Ciba-Geigy Limited Bonded Structures Division, Duxford, Cambridge.

b. Silcoset 105 supplied by ICI Limited, Stevenston, Ayrshire.

c. Silcoset curing agent A supplied by ICI Limited, Stevenston, Aryshire.

d. Armospheres, hollow glass spheres, supplied by Armoform 1958 Limited, Mill Street East, Dewsbury, Yorkshire.

The Armospheres should be sieved before use; preferably only that fraction retained on a 100 mesh sieve is used in production of the mixture. The Silcoset 105 is preferably thoroughly mixed by stirring with 0.5% by weight of the curing agent A, and then 70% by weight of Armospheres are uniformly incorporated into the mix, also by stirring.

The resultant mixture is placed in a suitable mould tool, which is arranged to receive a sheet of Aeroweb section of predetermined dimensions substantially greater than the cross-sectional area of an individual energy absorber 20. The Aeroweb sheet is arranged to be a slide fit in the mould. The sheet is preferably degreased, and after drying it is forced into the mould so that the mixture therein is forced into the interstices of the honeycomb section. The mixture in the mould is made level prior to insertion of the sheet, and the latter is pushed into the mixture so that the mixture is forced evenly into the interstices to give a predetermined degree of filling. The filled sheet can be removed from the mould, and left to cure at room temperature.

Individual energy absorbers can then be cut from the filled sheet by cutting the latter transversely to the general plane of the sheet. If required, the absorbers 20 can be completed by bonding aluminium foil around their circumference, the foil being secured to the filled section by means of a suitable adhesive.

The invention offers an energy absorbing material which can be provided with a controlled energy absorbing characteristic dependent upon the proportion of void forming members in the resilient material. This latter proportion can be readily controlled. The invention is not limited to the specific materials mentioned above. Many alternative elastomers can be used. Silcoset materials are particularly suitable because they retain their resilience even at low temperatures, and they are convenient because they can be cured at room temperatures. There are also many other types of void forming members. For example, plastics spheres, or enclosures, of other shapes, may be used, and glass (or other material) spheres other than Armospheres may be found suitable. It may also be desirable to use void forming members which are deformable rather than frangible in the course of crushing of the energy absorber.

Energy absorbers in accordance with the invention may find use in applications other than rocket flight terminators. For example, they may be employed as energy absorbing materials in the production of motor vehicles. In such applications, there may be no necessity to provide a "skeleton" structure such as the Aeroweb section referred to above. Alternatively, other materials, or sections, may be found useful in other applications of the invention.

I claim:

1. An energy absorber having first and second portions of different energy absorbing characteristics comprising a non-resiliently deformable, open-cell structure having cells partly filled with crushable material comprising void-forming members embedded in a matrix, the void-forming members being of substantially smaller dimensions than the cells of the structure, said open-cell structure projecting from said matrix whereby the filled portion of the structure forms one of said portions and whereby the projecting unfilled portion of the structure forms the other of said portions.

2. An absorber as in claim 1 wherein the void-forming members are hollow enclosures.

3. An absorber as in claim 1 wherein the void-forming members are frangible.

4. An absorber as in claim 1 wherein the matrix is made of resilient material.

5. An absorber as in claim 1 wherein the deformable open-cell structure has a honeycomb cross-section.

6. Apparatus comprising an element movable in a given direction and an energy absorber as in claim 1 adapted to absorb energy from the element during such movement.

7. Apparatus as in claim 6 in the form of a pressure release valve, the movable element being a valve opening member.

8. Apparatus as in claim 7 wherein said energy absorber comprises first and second portions of different energy absorbing characteristics, said valve being adapted to open during crushing of the portion of lesser energy absorbing capability.

9. A method of forming an energy absorber having first and second portions of different energy absorbing characteristics, said method comprising the steps of providing a non-resiliently deformable open-cell structure having cells, partially filling the cells with a crushable material to thereby form a filled portion of the structure and an unfilled portion of the structure, said material comprising a matrix material in a flowable form with void-forming members distributed therethrough and the void-forming members being of substantially smaller dimensions than the cells of the deformable structure to permit the void-forming members to penetrate the cells with the flowable matrix, and solidifying the matrix material in said filled portion whereby said filled and unfilled portions form said first and second portions of different energy absorbing characteristics.

10. A method as in claim 9 for forming a plurality of energy absorbers simultaneously comprising the steps of forcing a sheetlike cellular structure into the crushable material, and dividing the resultant composite sheet transversely thereto to form the individual energy absorbers.

11. An energy absorber having first and second portions of different energy absorbing characteristics comprising a non-resilient deformable structure which forms a plurality of open internal cells arranged side-by-side and having parallel axes, a portion of the length of the cells being filled with a resilient matrix material which is continuous across the internal dimension of the cells and in which is embedded a plurality of deformable thin-walled hollow enclosures, said enclosures having axial and transverse dimensions, with respect to said cells, which are substantially less than the corresponding dimensions of said cells, and a portion of the length of the cells being unfilled whereby said filled and unfilled portions form said first and second portions of the absorber.

12. An energy absorber as in claim 11 wherein said matrix is an elastomer and wherein the walls of said enclosures are frangible.

13. An energy absorber as in claim 11 wherein said enclosures are hollow spheres constructed of plastics.

14. An energy absorber as in claim 11 wherein said deformable structure is metal.

15. An energy absorber as in claim 11 wherein said enclosures are constructed of glass.

* * * * *